April 22, 1952     C. C. S. LE CLAIR     2,594,041
APPARATUS TO LUBRICATE ROLLING ELEMENTS
OF CHAIN CONVEYERS OR ROLLING STOCK
Filed Feb. 15, 1949     3 Sheets-Sheet 1
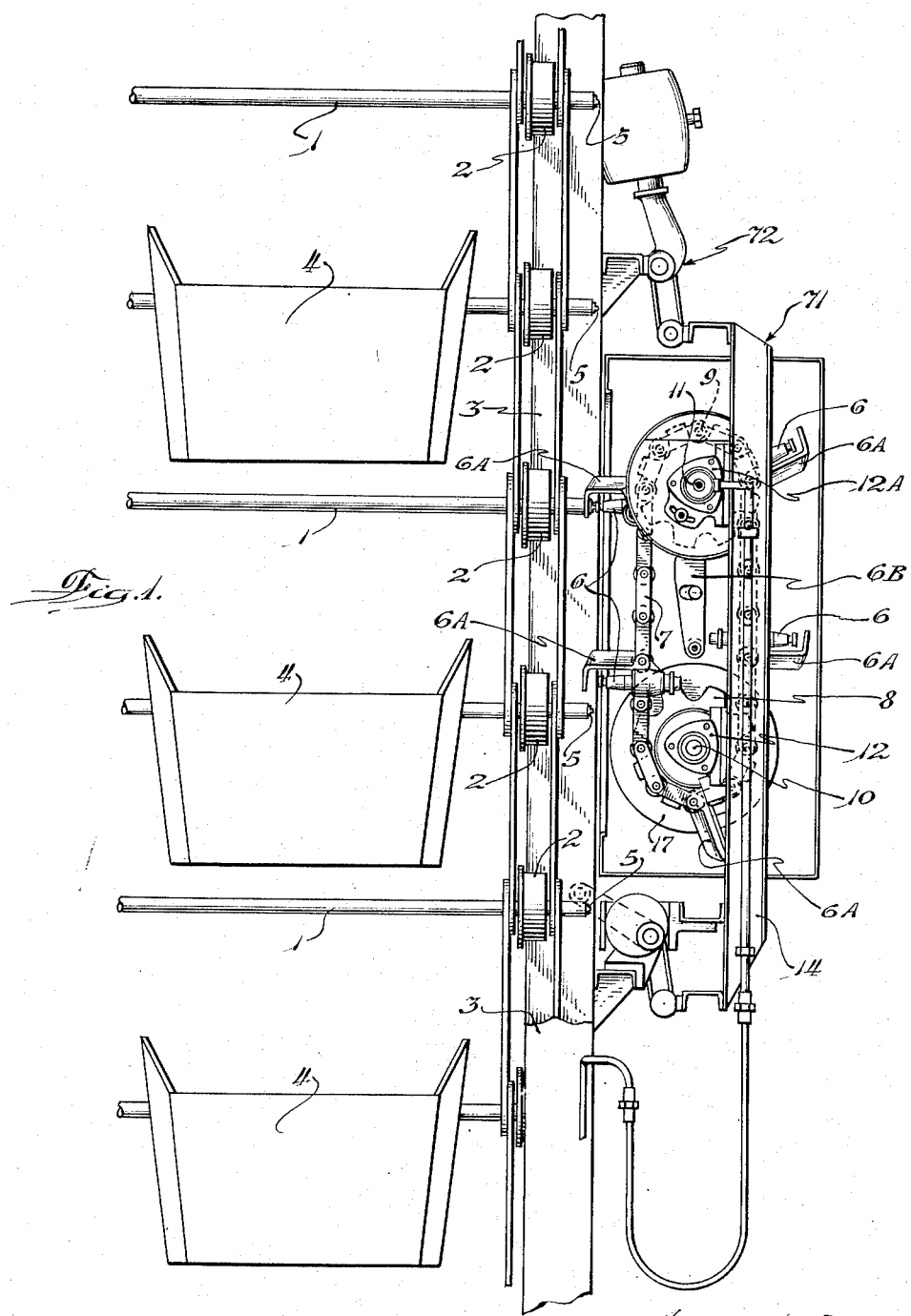

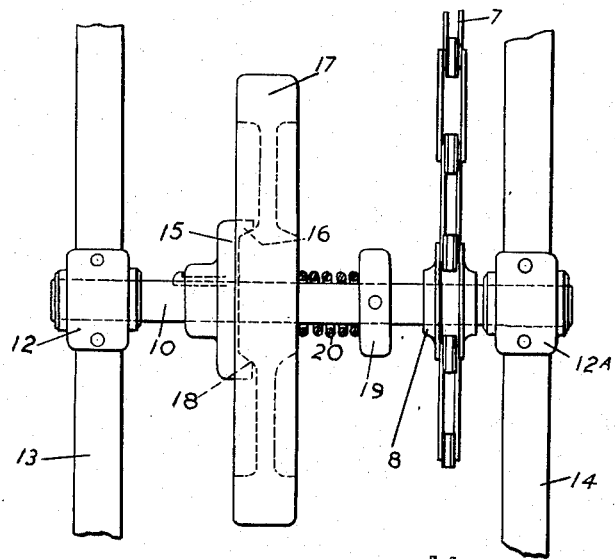
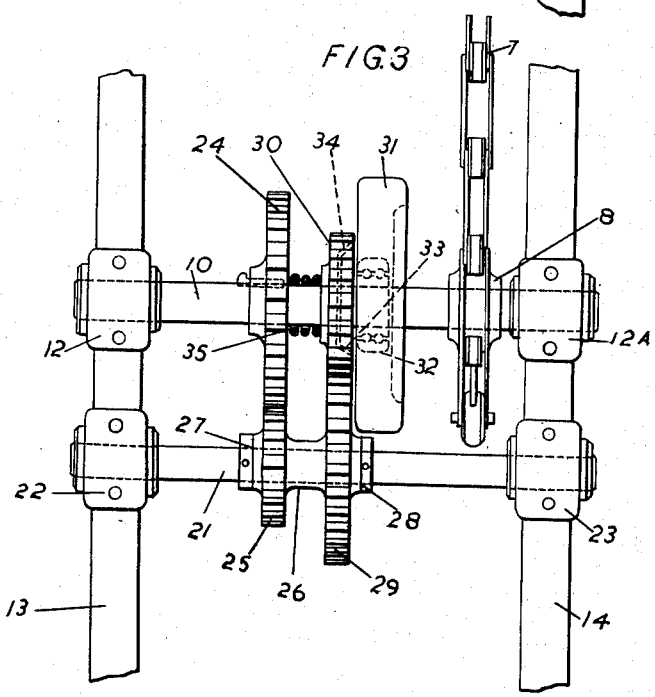

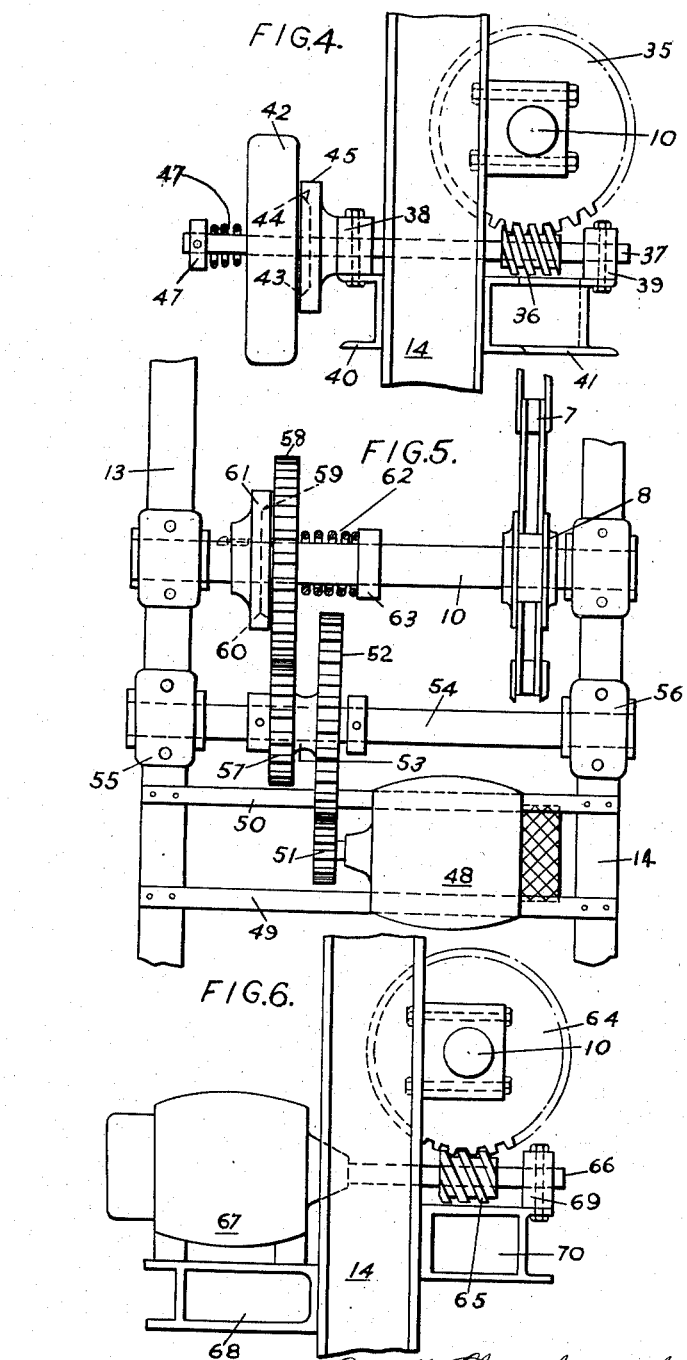

Patented Apr. 22, 1952

2,594,041

UNITED STATES PATENT OFFICE 2,594,041

APPARATUS TO LUBRICATE ROLLING ELEMENTS OF CHAIN CONVEYERS OR ROLLING STOCK

Camille Clare Sprankling Le Clair, Acton, London, England

Application February 15, 1949, Serial No. 76,584

17 Claims. (Cl. 184—15)

This invention relates to improvements in apparatus for dispensing lubricant to the wheels or rollers of chain conveyors and to the wheels of rolling stock, such as railway wagons or trucks, colliery and other tubs and so on. For simplicity of description, chain conveyors and all types of rolling stock to which this invention is applicable will be termed "conveyors" hereinafter. More specifically the present invention relates to improvements in the invention described and claimed in co-pending application Serial No. 703,064.

As described in the said patent application, lubricant is automatically dispensed to the spindles of a main conveyor while the latter is in motion by means of lubricating apparatus comprising a subsidiary endless satellite conveyor, which is arranged at one side of the main conveyor, and which has one of its runs adjacent, and parallel, to the main conveyor, and which receives its motion from, and moves in correct timed-relationship with, the main conveyor, and which also carries a number of spaced plunger-type grease guns. Each grease gun carries a driven means, such as a forked guide bracket, and the satellite conveyor and the grease guns mounted thereon are driven by the engagement of driving means on the moving main conveyor with the guide brackets carried by the grease guns mounted on that run of the satellite conveyor which is adjacent to the main conveyor. The said driving means usually consist of the spindles of the main conveyor.

During the time the grease guns are being moved in the said run of the satellite conveyor, operative parts of the guns are first forced bodily towards the main conveyor so that the gun discharge nozzles make sealing engagement with grease-receiving nipples on the said spindles. The gun plungers are then forced to carry out lubricant-discharging strokes, whereafter the operative parts of the guns are retracted bodily from the main conveyor.

In one constructional form of the apparatus, the satellite conveyor consists of an endless chain running over two chain sprockets fixed on spaced shafts which are mounted in bearings upon a framework, which latter can be moved towards and away from the main conveyor in order to bring the satellite conveyor with the grease guns thereon into and out of its operative position.

The correct functioning of this prior apparatus depends upon a correct relationship between the distance apart of the centres of the said satellite chain sprockets, the pitch of the grease guns mounted on the satellite chain, and the pitch of the spindles of the main conveyor when, as is preferred, the latter form the means for driving the satellite chain.

In practice, these distances cannot be determined by purely theoretical considerations but must be influenced by the pitches of standard chains available. Hence, it sometimes occurs that these practical limitations necessitate dimensions having to be chosen such that the correct relationships cannot be established and as a result the forked guide brackets, when they approach the main conveyor just before they reach the transverse plane of the shaft of that sprocket which is nearest to an advancing main conveyor spindle, do not "lead in" satisfactorily, but foul the advancing spindle.

Several methods of overcoming this difficulty, all of which were based on varying the angle of approach of the grease guns, were described in the said specification.

All of these methods, however, depended on the second main conveyor spindle coming into contact with the forked guide bracket of its associated grease gun before the forked bracket of the first gun had parted company from its main conveyor spindle and, therefore, while the satellite chain was still in motion.

While such methods are quite satisfactory up to a point they do not, however, give sufficient dimensional latitude to meet all cases and it has been found in practice that the difference between the pitch of the grease guns and the pitch of the main conveyor spindles must remain small in proportion to those pitches. Hence these methods may, and often do, entail special design work in individual cases and they do not cover a sufficiently wide range to meet all the cases occurring.

The object of the present invention, therefore, is to provide an alternative solution whereby special design work in every individual case can be avoided.

It will be obvious that if the said difference of pitch were sufficiently increased all question of "lead-in" difficulties would disappear but, on the other hand, since this would entail a time gap after one spindle and gun had parted company and before the next spindle and gun had engaged, the satellite chain would come to rest between each cycle of operation and a severe impact would be caused by the next spindle engaging, i. e., striking, a stationary gun, which would soon result in damage to the parts.

In order to overcome this difficulty, according to the present invention the satellite conveyor chain mechanism includes means adapted to provide energy for preventing the satellite conveyor chain from coming to rest during the said time gap when the chain is not being positively driven, the arrangement being such that the said driving means on the main conveyor will overtake and operatively engage the said driven means of the satellite conveyor chain without causing severe impacts.

The said energy may be provided in a number of different ways; for example, it may be kinetic or electric. If kinetic the said satellite conveyor chain mechanism may include means which is adapted to store kinetic energy while the satellite conveyor chain is being driven by the said driving means on the main conveyor and to give up a portion of such energy during the said time gap when the chain is not being positively driven, the arrangement being such that the said satellite conveyor is prevented from coming to rest and the driving means on the main conveyor will overtake and operatively engage the said driven means of the satellite conveyor chain without causing severe impacts.

If the energy is to be supplied in electric form the means for storing kinetic energy may be replaced by a small electric motor having insufficient power to drive the satellite chain mechanism at its full speed but having enough power to prevent it stopping and to keep it running at a slow speed, which is what is required.

The said means which is adapted to store kinetic energy and to give up a portion of such energy preferably consists of a flywheel or equivalent which may be mounted upon and receive its motion from the shaft of one of the chain sprockets of the satellite conveyor chain or which may be mounted upon and receive its motion from another shaft which is operatively connected to the said chain sprocket shaft.

In one constructional form of the invention a relatively large flywheel is fixedly mounted upon the shaft of one of the two sprockets of the satellite chain so that the motion of the shaft is communicated directly to the flywheel, and, conversely, the motion and energy of the latter is directly communicated to the said shaft.

In an alternative construction, use is made of a smaller flywheel which is loosely mounted upon the shaft of one of the two sprockets of the satellite chain or upon a separate shaft. In this case, as more fully described hereinafter, the motion of the sprocket shaft may be communicated to the flywheel and, conversely, the motion and energy of the latter may be communicated to the sprocket shaft, through a step-up gear train comprising a primary gear wheel fixed upon the sprocket shaft and intermediate gearwheels mounted upon one or more countershafts. This gearing arrangement is also suitable in cases where an electric motor is used to supply the required energy.

As an alternative, a single worm wheel fixed upon the shaft of one of the said chain sprockets could be arranged to drive a steep-pitch worm fixed upon a counter shaft carrying the flywheel. This gearing arrangement is also suitable where an electric motor is used.

It will be obvious that, in any of the above constructions, at starting, when the satellite chain is first put into engagement with the main conveyor, the satellite chain and the flywheel or equivalent or motor armature will be stationary, and, therefore, the first driving means on the main conveyor which contacts one of the driven means on the satellite chain will inevitably strike it a severe blow, more severe than if no flywheel or equivalent or motor were included.

To obviate this disadvantage it is preferred to put the satellite chain into engagement with the main conveyor before the latter is started, so that it will pick up its speed uniformly with the main conveyor.

Even so, it may be possible that the main conveyor will accelerate faster than it is conveniently possible to accelerate the flywheel or equivalent or motor armature and, consequently it is desirable to incorporate into the driving mechanism of the flywheel or motor a slipping clutch, which will permit the satellite chain mechanism to overrun the flywheel or equivalent or motor at starting up, or vice versa when stopping.

Several constructional forms of the invention are shown, by way of example, on the accompanying drawings, whereon:

Figure 1 is an elevational view of a main conveyor with the lubricating apparatus for the spindles thereof to one side;

Figure 2 shows a construction in which a flywheel is loosely mounted upon the shaft of one of the sprockets of the satellite chain mechanism, the motion of the flywheel being communicated to the said shaft through a slipping clutch;

Figure 3 shows a modified construction in which a flywheel is loosely mounted upon the shaft of one of the sprockets of the satellite chain mechanism, the flywheel being rotated through a gear train which includes a primary gearwheel fixed to the said shaft, intermediate gearing mounted upon a layshaft, and a slipping clutch, the energy of the flywheel being communicated to the sprocket shaft through the gear train and the slipping clutch;

Figure 4 shows another construction in which a flywheel is loosely mounted upon a layshaft which is connected to the shaft of one of the sprockets of the satellite chain mechanism through a worm fixed upon a layshaft and a wormwheel fixed upon the sprocket shaft, the energy of the flywheel being communicated to the sprocket shaft through a slipping clutch;

Figure 5 shows a modification in which an electric motor is adapted to drive the shaft upon which one of the sprockets of the satellite chain mechanism is fixed through a gear train including a gear wheel loosely mounted upon the said shaft, the motion of the said gearwheel being communicated to the said shaft through a slipping clutch; and Figure 6 shows another modification in which an electric motor is adapted to drive the shaft upon which one of the sprockets of the satellite chain mechanism is fixed through a worm fixed upon the motor shaft and a worm wheel fixed upon the sprocket shaft.

Referring first to Figure 1:

The main conveyor is of the endless chain type and comprises a number of interconnected horizontal spindles 1, each carrying a guide wheel 2 at either end which runs between track members 3 in the usual manner. Buckets 4 or the like are carried on alternate spindles of the conveyor. Each spindle is provided with a grease nipple 5 through which lubricant is fed into a lubricant duct in the spindle to the bearings of the guide wheels and the interconnecting links.

The means for automatically lubricating the main conveyor comprises a satellite or grease gun carrying conveyor chain 7 mounted at one side of the main conveyor with one or more of its runs of chain parallel to the vertical run of the main conveyor. The endless chain of the satellite conveyor runs from a lower sprocket 8 and also from an upper sprocket 9 which is spaced vertically from the lower sprocket. The two sprockets are mounted upon horizontal parallel spindles or shafts 10 and 11 which are arranged at right angles to the spindles 1 of the main conveyor and are rotatably carried in bearing members 12 and 12A (Figure 2) attached to a movable framework 71 which includes two spaced transverse members 13 and 14.

As explained more fully in the copending application Serial No. 703,064, the framework 71 is movable into and out of lubricant dispensing position by a balanced linkage 72.

The satellite conveyor shown is provided with five equally spaced lubricant dispensing plunger type grease guns 6, each of which carries a forked bracket 6A which is engageable by the outer end of a spindle 1 to drive the satellite conveyor. When a bracket 6A is engaged by the end of a spindle 1 the nozzle of the grease gun 6 is aligned with the nipple 5 on the spindle. During this time the grease gun is brought into contact with a stationary cam 6B and the operative parts of the grease gun are first forced bodily toward the main conveyor so that the gun discharge nozzle makes a sealing engagement with the nipple 5 and then the gun plunger is forced through a lubricant dispensing stroke. When the gun 6 has cleared the cam member 6B its operative parts are automatically retracted.

The grease gun 6 and brackets 6A are so spaced on the satellite conveyor chain 7 that the spacing between adjacent guns is slightly less than the spacing between adjacent spindles 1 or the spacing between successive spindles to be lubricated. As previously explained herein, practical difficulties are encountered in the design and construction of these lubricating conveyors which make it impossible to achieve a perfect theoretical design. Thus, the forked guide brackets sometimes do not "lead in" satisfactorily but foul the advancing spindle. Obviously this could be overcome by differently spacing the grease guns on the satellite conveyor before the satellite chain would come to rest between the cycles of operation and cause the next spindle to strike a stationary bracket 6A and gun 6 which would soon result in damage.

If the satellite conveyor is provided with a source of energy it can be prevented from coming to rest between lubricating cycles and the advancing spindle will "lead in" smoothly to a more slowly moving bracket 6A. In Figures 1 and 2 the energy is supplied from a relatively heavy flywheel 17 loosely mounted upon the shaft 10 between the sprocket 8 and the bearing 12. One side of the flywheel hub boss is shaped to provide a clutch face 18 adapted to cooperate with a conical clutch face 16 on the clutch member 15 which is keyed to the shaft 10. A collar 19 is fixed upon the shaft 10 and a coil spring 20 surrounds the shaft and reacts between the collar and the boss of the flywheel, the arrangement being such that the clutch face 18 is forced by the spring into frictional engagement with the clutch face 16.

Thus, when the apparatus is in operation the flywheel will run at the same speed as the shaft 10 and will keep the satellite conveyor running during any cyclical interruption of the drive of this conveyor. The clutch faces 16 and 18 act as a slipping clutch, so that even if the main conveyor should accelerate faster than it is conveniently possible to accelerate the flywheel, the slipping clutch will permit the satellite chain mechanism to overrun the flywheel at starting up.

In cases in which, for example, there is not enough space to use a relatively large flywheel as shown in Figure 2, heavy enough to contain and supply the necessary kinetic energy, a smaller flywheel may be used in association with means for driving it at a higher speed. Such an arrangement is shown in Figure 3.

In this construction, in addition to the lower shaft 10 upon which the lower chain sprocket 8 is fixed, a layshaft 21, which is parallel to the shaft 10, is turnably mounted in bearings 22 and 23 fixed respectively upon the channel bars 13 and 14. A gearwheel 24 is keyed to the shaft 10 and engages with a smaller gearwheel 25 which is integral with a sleeve member 26 loosely mounted upon the layshaft 21 and held against axial movement thereon by collars 27 and 28 fixed upon the layshaft. A larger gearwheel 29 is also integral with the sleeve member 26 and engages with a smaller gear wheel 30 which is loosely mounted upon the shaft 10 and forms part of a clutch member. A flywheel 31 is rotatably arranged upon ball bearings 32 mounted upon the shaft 10, the flywheel being formed with a conical clutch face 33 with which a conical clutch face 34 formed in the gearwheel 30 is pressed into frictional engagement by a coil spring 35 which reacts between the gearwheel 24 and the gearwheel 30. As in the construction shown in Figure 2, the clutch faces 33 and 34 form a slipping clutch and the latter and the flywheel function as in that construction.

When the apparatus is in operation the gearwheel 30 is driven through the gearwheels 24, 25 and 29 and the flywheel 31 is rotated through the slipping clutch 33 and 34, the latter and the flywheel functioning as in the construction shown in Figure 2.

In the modification shown in Figure 4, a worm wheel 35 is mounted upon the lower sprocket shaft 10 and engages a steep pitch worm 36 mounted upon a layshaft 37 arranged at a right angle to the shaft 10. The layshaft is supported in bearings 38 and 39 mounted upon transverse bearer members 40 and 41 fixed to the said channel bars 13 and 14. A flywheel 42 is loosely mounted upon the layshaft 37 and has a conical clutch face 43 which cooperates with a conical clutch face 44 formed in a clutch member 45 keyed to the layshaft. The clutch faces form a slipping clutch and they are held in frictional engagement by a spring 46 which reacts between the flywheel and a collar 47 fixed on the layshaft.

Figure 5 shows a modification of the arrangement shown in Figure 3 which includes an electric motor 48 carried by transverse bearers 49 and 50 fixed to the channel bars 13 and 14. A pinion 51 on the motor shaft engages with a larger gear wheel 52 which is integral with a sleeve 53 loosely mounted upon a layshaft 54 parallel to the lower sprocket shaft 10 and turnable in bearings 55 and 56 fixed upon the channel bars. The sleeve 53 is also integral with a gearwheel 57 which engages with a larger gearwheel 58 loosely mounted upon the sprocket shaft 10. The gear wheel 58 is formed with a conical clutch face 59 which engages with a conical clutch face 60 formed in a clutch member 61 keyed to the shaft 10. The clutch faces 59 and 60 form a slipping clutch and they are held in frictional engagement by a spring 62 which reacts between the gearwheel 58 and a collar 63 fixed upon the shaft 10.

In a modification of the arrangement shown in Figure 5, the electric motor 48 may be replaced by a flywheel which is mounted upon a shaft arranged parallel to the shaft 54 and is attached to or formed with a pinion which is engaged with the gearwheel 52.

In the construction shown in Figure 6, a worm wheel 64 is mounted upon the lower sprocket shaft 10 and it is driven through a worm 65 fixed upon the shaft 66 of an electric motor 67 mounted upon a transverse bearer 68 fixed to the channel bars 13 and 14, the motor shaft being turnably mounted in a bearing 69 mounted upon a transverse bearer 70 fixed to the channel bars. If so desired, a slipping clutch (not shown) may be incorporated in the worm wheel 64.

Conversely, it will also be appreciated that the slipping clutches described in connection with all the other constructions might, if desired, be omitted.

I claim:

1. Apparatus for supplying lubricant to the spindles of a moving main conveyor including a satellite endless chain conveyor arranged at one side of the main conveyor with one of its runs adjacent to the latter, a plurality of spaced driven means on the satellite conveyor and a plurality of spaced driving means on the main conveyor adapted to overtake and engage the driven means so as to drive the satellite conveyor in such manner that the satellite conveyor run is driven in the same direction as the main conveyor, characterized by energy supplying means separate from the satellite conveyor structure, and means for connecting said energy supplying means to drive the satellite conveyor when the main conveyor driving means is not driving the satellite conveyor driven means, to prevent the satellite conveyor coming to rest in the time gap when a driving means is not driving a driven means and to allow a driving means to overtake and engage a driven means without causing severe impact.

2. Apparatus for supplying lubricant to the spindles of a moving main conveyor including a satellite endless chain conveyor arranged at one side of the main conveyor with one of its runs adjacent to the latter, a plurality of spaced driven means on the satellite conveyor and a plurality of spaced driving means on the main conveyor adapted to overtake and engage the driven means so as to drive the satellite conveyor in such manner that the satellite conveyor run is driven in the same direction as the main conveyor, characterized by kinetic energy storing means separate from the satellite conveyor structure, and means connecting said kinetic energy storing means to be driven by the satellite conveyor to store energy and to drive the satellite conveyor when the main conveyor driving means is not driving the satellite conveyor driven means, to prevent the satellite conveyor coming to rest in the time gap when a driving means is not driving a driven means and to allow a driving means to overtake and engage a driven means without causing severe impact.

3. Apparatus for supplying lubricant to the spindles of a moving main conveyor including a satellite endless chain conveyor having a sprocket fixedly mounted on a shaft, said satellite conveyor being arranged at one side of the main conveyor with one of its runs adjacent to the latter, a plurality of spaced driven means on the satellite conveyor and a plurality of spaced driving means on the main conveyor adapted to overtake and engage the driven means so as to drive the satellite conveyor in such manner that the satellite conveyor run is driven in the same direction as the main conveyor, characterized by an electric motor having an armature shaft, and gearing connecting said armature shaft with the satellite conveyor sprocket shaft said electric motor driving the satellite conveyor when the main conveyor driving means is not driving the satellite conveyor driven means, to prevent the satellite conveyor coming to rest in the time gap when a driving means is not driving a driven means and to allow a driving means to overtake and engage a driven means without causing severe impact.

4. Apparatus for supplying lubricant to the spindles of a main conveyor including a satellite endless chain conveyor having a sprocket fixedly mounted on a shaft, said satellite conveyor being arranged at one side of the main conveyor with one of its runs adjacent to the latter, a plurality of spaced driven means on the satellite conveyor and a plurality of spaced driving means on the main conveyor adapted to overtake and engage the driven means so as to drive the satellite conveyor in such manner that the satellite conveyor run is driven in the same direction as the main conveyor, characterized by a flywheel mounted on the satellite conveyor sprocket shaft to be driven thereby to store kinetic energy and to drive the sprocket shaft when the main conveyor driving means is not driving the satellite conveyor driven means, to prevent the satellite conveyor coming to rest in the time gap when a driving means is not driving a driven means and to allow a driving means to overtake and engage a driven means without causing severe impact.

5. Apparatus for supplying lubricant to the spindles of a main conveyor including a satellite endless chain conveyor having a sprocket fixedly mounted on a shaft, said satellite conveyor being arranged at one side of the main conveyor with one of its runs adjacent to the latter, a plurality of spaced driven means on the satellite conveyor and a plurality of spaced driving means on the main conveyor adapted to overtake and engage the driven means so as to drive the satellite conveyor in such manner that the satellite conveyor run is driven in the same direction as the main conveyor, characterized by a flywheel rotatably mounted on the satellite conveyor shaft, and means including a gear train to drive said flywheel from the shaft thereby to store kinetic energy and to drive the sprocket shaft from said flywheel when the main conveyor driving means is not driving the satellite conveyor driven means, to prevent the satellite conveyor coming to rest in the time gap when a driving means is not driving a driven means and to allow a driving means to overtake and engage a driven means without causing severe impact.

6. Apparatus as claimed in claim 5 wherein said gear train comprises a primary gear fixedly mounted on the sprocket shaft, and intermediate gears mounted on at least one countershaft.

7. Apparatus for supplying lubricant to the spindles of a main conveyor including a satellite endless chain conveyor having a sprocket and arranged at one side of the main conveyor with one of its runs adjacent to the latter, a plurality of spaced driving means on the main conveyor adapted to overtake and engage the driven means so as to drive the satellite conveyor in such manner that the satellite conveyor is driven in the same direction as the main conveyor, characterized by a countershaft, a flywheel mounted on said countershaft, and means operatively connecting said flywheel to the sprocket to drive said flywheel from the sprocket thereby to store kinetic energy and to drive the sprocket from said flywheel when the main conveyor driving means is not driving the satellite conveyor driven means, to prevent the satellite conveyor coming to rest in the time gap when a driving means is not driving a driven means and to allow a driving means to overtake and engage a driven means without causing severe impact.

8. Apparatus as claimed in claim 4 including a slipping clutch interposed between said flywheel and the satellite conveyor sprocket shaft to permit the shaft to overrun said flywheel.

9. Apparatus as claimed in claim 5 including a slipping clutch interposed between said flywheel and said gear train to permit said gear train to overrun said flywheel.

10. Apparatus as claimed in claim 7 including a slipping clutch interposed between said flywheel and the main conveyor sprocket to permit the sprocket to overrun said flywheel.

11. Apparatus for supplying lubricant to the spindles of a main conveyor including a satellite endless chain conveyor having a sprocket and being arranged at one side of the main conveyor with one of its runs adjacent to the latter, a plurality of spaced driven means on the satellite conveyor and a plurality of spaced driving means on the main conveyor adapted to overtake and engage the driven means so as to drive the satellite conveyor in such manner that the satellite conveyor run is driven in the same direction as the main conveyor, characterized by a flywheel, means including a slipping clutch comprising a pair of clutch parts operatively connecting said flywheel to the satellite conveyor sprocket, resilient means holding said clutch parts in frictional engagement, whereby said flywheel is driven from the sprocket to store kinetic energy and the sprocket is driven from said flywheel when the main conveyor driving means is not driving the satellite conveyor driven means thereby to prevent the satellite conveyor coming to rest in the time gap when a driving means is not driving a driven means and to allow a driving means to overtake and engage a driven means without causing severe impact.

12. Apparatus as claimed in claim 11 wherein one of said clutch parts is formed on said flywheel.

13. Apparatus as claimed in claim 5, wherein said flywheel driving means includes a two part slipping clutch, one of said clutch parts being formed on a gear in said gear train.

14. Apparatus for supplying lubricant to the spindles of a main conveyor including a satellite endless chain conveyor having a sprocket fixedly mounted on a shaft, said satellite conveyor being arranged at one side of the main conveyor with one of its runs adjacent to the latter, a plurality of spaced driven means on the satellite conveyor and a plurality of spaced driving means on the main conveyor adapted to overtake and engage the driven means so as to drive the satellite conveyor in such manner that the satellite conveyor run is driven in the same direction as the main conveyor, characterized by an electric motor having a motor shaft, and a gear train including a pinion on said motor shaft, a primary gear on the sprocket shaft and intermediate gears on at least one countershaft, whereby said electric motor drives the sprocket shaft when the main conveyor driving means is not driving the satellite conveyor driven means thereby to prevent the satellite conveyor coming to rest in the time gap when a driving means is not driving a driven means and to allow a driving means to overtake and engage a driven means without causing severe impact.

15. Apparatus as claimed in claim 14, including a slipping clutch in the drive between said motor shaft and the sprocket shaft to permit the sprocket shaft to overrun said motor shaft.

16. Apparatus for supplying lubricant to the spindles of a main conveyor including a satellite endless chain conveyor having a sprocket fixedly mounted on a shaft, said satellite conveyor being arranged at one side of the main conveyor with one of its runs adjacent to the latter, a plurality of spaced driven means on the satellite conveyor and a plurality of spaced driving means on the main conveyor adapted to overtake and engage the driven means so as to drive the satellite conveyor in such manner that the satellite conveyor run is driven in the same direction as the main conveyor, characterized by an electric motor having a motor shaft, a steep pitch worm on said motor shaft, and a worm wheel on the sprocket shaft and engaging said worm, whereby said electric motor drives the sprocket shaft when the main conveyor driving means is not driving the satellite conveyor driven means, thereby to prevent the satellite conveyor coming to rest in the time gap when a driving means is not driving a driven means and to allow a driving means to overtake and engage a driven means without causing severe impact.

17. Apparatus as claimed in claim 16, including a slipping clutch in the drive between said motor shaft and the sprocket shaft to permit the sprocket shaft to overrun said motor shaft.

CAMILLE CLARE SPRANKLING LE CLAIR.

REFERENCES CITED

The following references are of record in the file of this patent:

FOREIGN PATENTS

| Number | Country | Date |
|---|---|---|
| 238,580 | Great Britain | Aug. 5, 1926 |